United States Patent [19]

Martin

[11] 4,101,867
[45] Jul. 18, 1978

[54] METHOD OF DETERMINING WEATHERING CORRECTIONS IN SEISMIC OPERATIONS

[75] Inventor: Lincoln A. Martin, Altadena, Calif.

[73] Assignee: Geophysical Systems Corporation, Pasadena, Calif.

[21] Appl. No.: 666,360

[22] Filed: Mar. 12, 1976

[51] Int. Cl.² ............................................. G01V 1/36
[52] U.S. Cl. ..................... 340/15.5 TC; 340/15.5 TD; 340/15.5 MC; 340/15.5 CC
[58] Field of Search ............... 340/15.5 TD, 15.5 CC, 340/15.5 TC, 15.5 MC, 15.5 CP

[56] References Cited

U.S. PATENT DOCUMENTS

| 2,087,120 | 7/1937 | Salvatori et al. | 340/15.5 TC |
| 2,981,928 | 4/1961 | Crawford et al. | 340/15.5 CP |
| 3,629,798 | 12/1971 | Rockwell | 340/15.5 TC |
| 3,681,749 | 8/1972 | Ferree et al. | 340/15.5 TC |
| 3,731,269 | 5/1973 | Judson et al. | 340/15.5 TC |
| 3,747,055 | 7/1973 | Greene, Jr. | 340/15.5 CP |
| 3,794,827 | 2/1974 | Widess | 340/15.5 CP |

OTHER PUBLICATIONS

"A Technique for Solving the Low-Velocity Layer Problem", Thompson, Geophysics, vol. 28, No. 5, Oct. 63, pp. 869-876.
"Exploration Geophysics", Sukosky, 1950, pp. 714-725.

Primary Examiner—Howard A. Birmiel
Attorney, Agent, or Firm—Daniel Silverman

[57] ABSTRACT

The method of determining the magnitude of the differential static correction between adjacent records in seismic record processing, that involves the steps of: recording a first multi-trace record responsive to a first seismic wave generated at a first source point; recording a second corresponding multi-trace record responsive to a second seismic wave at a second source point, which is adjacent to the first source point; correlating a first trace of the first record with the corresponding first trace of the second record, and determining the first time difference between the two first traces of said two records; repeating the correlation step and determining the time differences for a plurality of N pairs of traces; adding all of the N time differences and dividing the sum by N to find the net difference in static correction between the first and second source points.

20 Claims, 7 Drawing Figures

METHOD OF DETERMINING WEATHERING CORRECTIONS IN SEISMIC OPERATIONS

REFERENCE TO RELATED APPLICATION:

This application is related to the copending application Ser. No. 617,859, filed: Sept. 29, 1975; entitled: Method and Apparatus for Processing Seismic Signals from Low Energy Sources, of Lincoln A. Martin and William F. Fenley Jr. Application Ser. No. 617,859 now U.S. Pat. No. 4,058,791 is entered into this application by reference.

This application is related also to the copending application Ser. No. 666,359 of Daniel Silverman filed on the same date as this application and entitled: Method of Determining Weathering Corrections in Seismic Record Processing, now U.S. Pat. No. 4,069,471.

Before going into a detailed description of the prior art and of this invention, it would be well to briefly define some of the parameters which are involved in the process of this invention, so as to help clarify the descriptions that will be made.

DEFINITIONS

CORRELATION: Identifying a phase of a seismic record as representing the same phase of another record. Indicating that events on two seismic record or traces are reflections from the same stratigraphic sequence or refractions from the same marker.

CROSS CORRELATION FUNCTION: A measure of the similarity of two waveforms. A graph of the results of a correlation operation. A correlogram.

FIRST BREAK: The first recorded signal attributable to seismic wave travel from a known source. First breaks on reflection records are used for information about the weathering.

RECORD: A recording of the energy from one shot or other type of source, picked up by a spread of geophones. A record may be on photographic or other paper, or on magnetic tape. A TRACE is a record of a single geophone channel.

REFRACTION WAVE: A wave which travels obliquely downward from a source in a low velocity formation to a high velocity formation, then within the high velocity formation parallel to the interface, and finally, obliquely upward in the low velocity formation to the detectors.

WEATHERING: The low velocity layer, a zone of low velocity material near the earth's surface, at the base of which the velocity abruptly increases. The term LVL (lower velocity layer) is also often used. Weathering velocity is typically 1500 to 2500 fps. The subweathering velocity may be 5000fps or greater.

WEATHERING CORRECTION: A correction of seismic reflection or refraction times to remove the delay in the LVL.

TIME BREAK: The mark on a seismic record which indicates the shot instant or the time at which the seismic wave from any type of source was generated.

TRAVELTIME: The time between the time break and the recording of a seismic event, such as a first break.

SOURCEPOINT: Position of the source of the seismic wave.

RECEIVER POINT: GEOPHONE POINT: Position of the geophone or other receiver or detector of the seismic wave.

BACKGROUND OF THE INVENTION

This invention lies in the field of seismic processing. More particularly, it concerns the determination of weathering or static corrections between records recorded from sources at adjacent source points, or between traces to adjacent geophone points.

While this invention can be used with any type of source, it is of greatest value in relation to sources which are initiated at the surface of the earth, such as the Vibroseis, the Dynoseis, the thumper, and others. It will for convenience be described in terms of the vibratory source systems.

In the seismic process of geophysical prospecting, wherein a vibratory source generates an alternating pressure on the surface of the earth at a first source point, it is important to know the time of travel of the seismic wave from the surface through the weathered layer. More correctly, it is important to know the difference in the times of travel through the weathered layer of the downgoing seismic waves generated by the source at each of two adjacent source points. This is needed to properly interpret travel time differences to reflecting interfaces, so as to determine the slope or the dip of those reflecting interfaces. These differences in time through the weathered (or weathering or LVL) layer are called the fixed or static corrections.

A. In the case of dynamite shots, the travel time of the seismic wave through the weathering, or the depth to the base of weathering, can often be determined from measurement of the seismic pulse from the deep shot to a surface geophone at the shot point. This is called the uphole time. Of course, this method can not be used with surface sources.

B. Another qualitative method involves determining static corrections by adjusting travel times so that a strong shallow reflection, which is believed to be flat, will be shown on the record as a true horizontal reflection.

C. Another qualitative method that has been used involves adjusting the travel times of a plurality of travel paths from different source and receiver points to the same common reflection point.

Vibratory seismic systems and other systems that use seismic sources at the surface of the earth, are limited in their capability to determine static corrections, because there are no drilled holes, and no subsurface sources.

The method of determination as described in B and C above are not reliable, since basing the corrections on deep reflection information involves many variables, few of which are known. It is clear therefor that there is no reliable method in use today for determining the static corrections.

SUMMARY OF THE INVENTION

It is a primary object of this invention to provide a method of determining the differential static correction between adjacent source points by timing corresponding traces of two records taken at adjacent source points.

It is a further object of this invention to determine the time differences between two corresponding traces (having the same source to detector distances) by correlating portions of those traces, one against the other, repeating the correlations for other corresponding pairs of traces, and determining the average travel time difference for all pairs.

These and other objects and advantages of this invention are realized and the limitations of the prior art are overcome in this invention by recording two multiple trace records taken from adjacent source points. The first refraction portions of each trace from the first break to a selected time value past the first break are isolated. These refraction portions of the record, in pairs of traces having the same source to detector distances, are correlated, and the lead or lag of one trace with respect to the other are determined. These leads or lags are algebraically added for all pairs of traces (or as many pairs as possible) and the average difference determined. This average difference is the lead or lag of the travel time through the weathered layer, at the source positions, which is the relative static correction of the second record with respect to the first record.

This method provides a precise value for the difference in travel time to the base of weathering at each source point. The precision of measurement is increased with increase in the number of pairs of traces correlated, and with decrease in the spacing between adjacent source points.

Consequently, the precision is greatest in records taken with surface sources, where a great number of separate channels are recorded and, where a source is positioned at each detector position. Such a system is fully described in copending application Ser. No. 617,859 to which reference has been made and which is entered by reference into this application.

BRIEF DESCRIPTION OF THE DRAWINGS

These and other objects and advantages of this invention and a better understanding of the principles and details of the invention will be evident from the following description taken in conjunction with the appended drawings, in which.

DESCRIPTION OF THE PREFERRED EMBODIMENT

Figure 1:
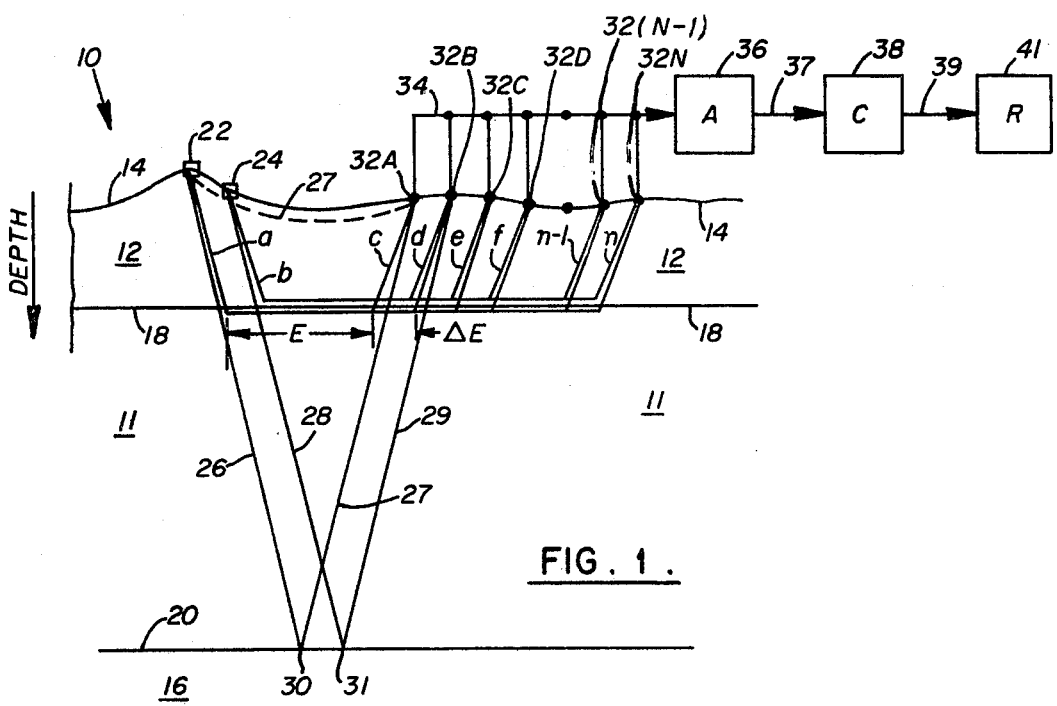
FIG. 1 illustrates the transmission of seismic energy from a pair of adjacent source points to a plurality of spaced geophones on the surface, by refraction at the base of the weathered layer, and by reflection to a deep reflecting interface.

Referring now to the drawing, and in particular to FIG. 1, there is shown a crosssection of a portion of the earth 10, having a surface contour 14, a weathered layer 12, an interface plane 18 between the weathered layer 12 and the subweathered layer 11. At some greater depth there is another reflecting interface (or plane) 20 between two geologic formations 11 and 16.

There are two source positions 22,24 on the surface 14. These can be vibratory sources or impulsive sources. If they are vibratory sources the records must be correlated with the sweep to get correlated traces or correlograms, which are then processed.

A plurality of geophones 32A, 32B, 32C .. 32(N−1), 32N are positioned on the surface, along the survey line, through which the vertical crosssection is taken. The spacing along the surface of the source points 22,24 and the geophone positions, is $\Delta E$. Preferably, the sources are located at geophone positions.

When a source is at position 22 and energized, the seismic wave will progress by path a,E,c to geophone 32A. That is, the energy goes substantially vertically downward, a, to the base of weathering interface 18. The velocity of propagation of the seismic (elastic) wave in the weathered layer 12 is quite low, of the order of 1500 to 2500 fps. The velocity of propagation in the subweathered layer 11 (just below the interface 18) may be 5000 to 6000 fps. So energy that goes down to the interface 18 and is refracted, E, horizontally in 11, then up, c, to 32A, will be the first signal (first break, or first arrival) to reach the geophone 32A. It will arrive before the energy through the direct path 27 arrives, because of the low velocity in 12.

This path is important since it includes the leg a, which, because of the unknown low velocity in 12, represents a sizeable time interval. If the thickness of the weathered layer is known imperfectly, and its velocity is known imperfectly, there can be a large time error in determining the vertical travel time through the weathered layer.

Drawn in FIG. 1 are ray paths 26, 28 from source positions 22,24 to a deep reflecting horizon 20, where the rays are reflected at 30, 31 and returned to the surface by rays 27,29 to geophones 32A, 32B etc. It will be clear that the path a, through the weathered layer 12 forms a part of the paths 26,27 to the geophones. Thus, error in determination of the travel time through the leg a, can cause a large error in estimation of the depth of the interface 20.

While it is desireable to know the absolute travel times a, and b, it is impossible to get that information without drilling a hole to the interface 18 and actually measuring the travel time.

While the absolute depth of the reflecting interface 20 is desireable, the most important parameter is the dip or slope of the interface 20. This can be found by taking the difference in the travel times over the adjacent legs a, and b, since by repeating the process between successive pairs of source points, the weathering time difference between any two source points can be determined. The problem then resolves itself into finding the travel time differences over paths a, and b.

Figures 2, 3:
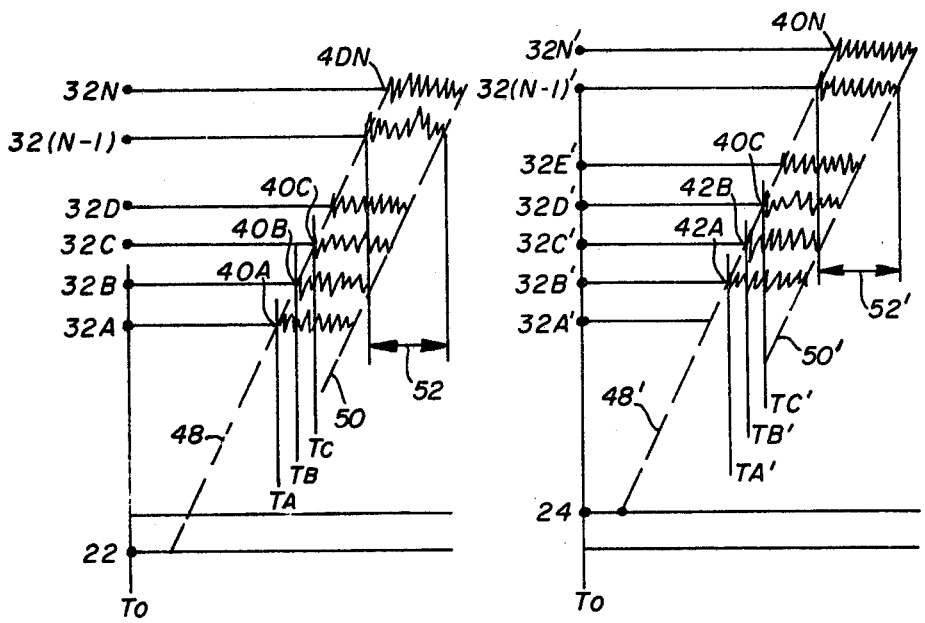
FIGS. 2 and 3 illustrate the refraction portions of traces recorded from adjacent source points.

Refer now to FIGS. 2 and 3. These are parts of 2 records taken with the source successively at points 22 and 24, respectively. The vertical line $T_O$ represents the time break, or time at which the source acted. The traces labelled 32A, 32B...32N represent the corresponding traces which represent the seismic energy received at the corresponding geophones. The signals from the geophones go by leads 34 to a multi-channel amplifier assembly 36, and then by leads 37 to a correlator 38, where the traces are correlated against a sweep signal, and then by leads 39 to a recorder 41. The correlation step need not be done "on line", but all of these steps are well known in the industry and need not be described further.

The early parts (or the refraction portions) of the traces of a record recorded with source 22 would be as shown in FIG. 2, and with source 24, as shown in FIG. 3. Because the succeeding geophone positions 32A, 32B, 32C etc. are farther from the source the first signals arrive at later times after $T_O$.

Consider the start of the traces 40A, 40B, 40C etc. for example, marked by times $T_A$, $T_B$, $T_C$ etc. By using high amplifier gain, it is sometimes possible to spread out and make clear traces as in FIGS. 4 and 5. Here it is possible by eye to make a rather precise estimate of $T_A$, $T_B$, etc. by observing the specific time instant that the trace "breaks" from the quiet line prior to the arrival of energy at 54.

Returning to FIGS. 1 and 2, it will be clear that $T_A$ is the travel time through paths $a,E,c$, or:

$$T_A = a + E + c$$
$$T_B = a + E + \Delta E + d$$
$$T_C = a + E + 2\Delta E + 3, \text{ and so on} \quad (1)$$

Also, from source point 24 and the second record:

$$T_A' = b + E + d$$
$$T_B' = b + E + \Delta E + e$$
$$T_C' = b + E + 2\Delta E + f \text{ and so on} \quad (2)$$

It was shown that the quantity of interest is the time difference through paths $a$ and $b$, or simply $(a-b)$. Thus, the Correction (or Weathering Correction) (22-24) equals $(a-b)$. Thus:

$$T_A - T_A' = (a + c) - (b + d) = [a - b + c - d] \quad (3.)$$
$$T_B - T_B' = [a - b + d - e]$$
$$T_C - T_C' = [a - b + e - f]$$

and so on, leaving out the E's since they clearly cancel out.

Now, take the sum of these N time differences, and divide the sum by N, to get the average.

$$\text{Corr. (22-24)} = 1/N [N(a-b) + (c-f)],$$

or for N traces $$\text{Corr. (22-24)} = 1/N [N(a-b) + c - n] = (a-b) + (c-n)/N \quad (4.)$$

Since $c$ and $n$ are approximately equal, and are divided by a large number N, the weathering correction required is:

$$\text{Corr (22-24)} = (a-b) = 1/N [(T_A - T_A') + (T_B - T_B') \ldots ]5.$$

Figure 4:
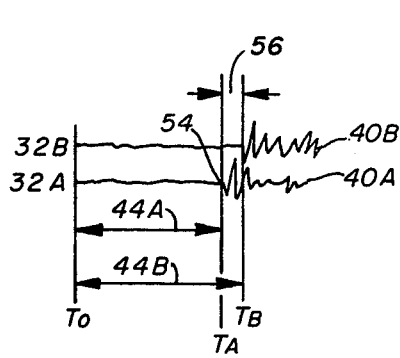
FIGS. 4 and 5 illustrate further detail of the records of FIGS. 2 and 3.
Figure 5:
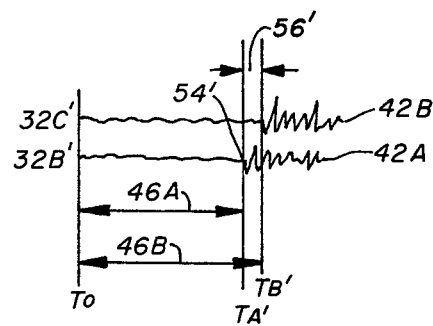

If the records are such, as in FIGS. 4 and 5 that the times $T_A$, $T_A'$, $T_B$, $T_B'$ etc. can be read by eye and compared, or, if the two traces 32A and 32B' can be recorded side by side and a judgement made of the displacement of points 54, 54', the differences can be estimated. This would be called "correlation by eye" and this type of correlation by eye (to time reflection events on traces) has been done extensively in the past.

There is a more precise way of determining the differences in timing 54 and 54', and that is by mathematically correlating the traces 32A and 32B' against each other.

Reference is made to U.S. Pat. No. 2,889,000 issued June 2, 1959 in the name of Silverman et al, entitled; Seismic Surveying. In this patent it is taught how to correlate two separate traces from the same record from the same source but for different geophone distances from the source. This is referred to for the purpose of illustrating apparatus that can be used for making trace correlations. Other apparatus for making correlations between two seismic trace wave forms is also well known in the industry, and need not be further discussed, particularly since this apparatus forms no part of this invention.

It is clear that this U.S. Pat. No. 2,889,000 does not anticipate this invention because claims (claim 1) specifically call for correlating two traces taken at different distances from the source on the same record, while this invention calls for correlating two traces from different sources and for the same source geophone distance.

It is possible to describe the method of this invention as:

At two adjacent source locations sequentially recording a plurality of traces at a plurality of geophones spaced from the source, selecting two geophone signals from geophones spaced from the source in successive records by equal distances, slowly varying the time phase between the two signals (traces), repeatedly multiplying together the signals received at these geophones, to produce product functions, repeatedly forming the integral of these product functions for separate different values of time phase, and recording the values of these integrals in relation to the different values of the varying time phase. This is the classical mathematical process of correlation.

In this method, the steps to determine $T_A - T_A'$ etc, will be done by correlation. This will include the classical process just described, or the optical correlation between selected traces, to measure a time difference, or the separate measurement of times $T_A$, $T_B$, $T_B'$, $T_C'$, etc. and the determination of time differences.

To perform the classical correlation on traces 40A, 42A, 40B, 42B, etc. it is necessary to isolate pairs of traces 32A from source 22 and 32B' from source 24, and so on. The entire trace can be used, or only the part of it. Since the part of real value is the first part of the trace, where the principal energy comes by the refraction of energy at the base of weathering, it is preferable to isolate the first part of the trace, say for 100milliseconds, or perhaps 150, or 250 ms, with the remainder of the trace muted.

Selecting appropriate pairs of short traces for equally distant traces, on adjacent records, as shown in equation 5, and summing the times for N pairs of traces, and dividing the sum by N, will provide a precise value of difference in static correction for adjacent source points. By choosing the next pair of adjacent source points and records, a second differential value is found, and so on. Thus it is possible to determine the difference in static correction for widely spaced source points by this process using successive closely space pairs of source points.

It will be clear that the larger the number of traces N, the larger the number of pairs of traces, and the better averaging of the correlograms of pairs of traces, to the end that the effects of noise on the traces are minimized, and as precise a value of weathering correction as desired can be determined. Also, the closer the position of the two source points, the more precise the value of correction.

In the ultimate case, the preferred system provides a great number of separate traces, say up to 256, with a source point at each geophone position. While this involves handling on a computer a great number of traces, it only requires a short length of trace. Furthermore, as has been shown in application Ser. No. 617,859, by recording each trace to only 1 bit, and by compositing a great many traces, it is possible to store and handle many traces at great speed, to provide a precise determination of fixed corrections.

Figure 6:
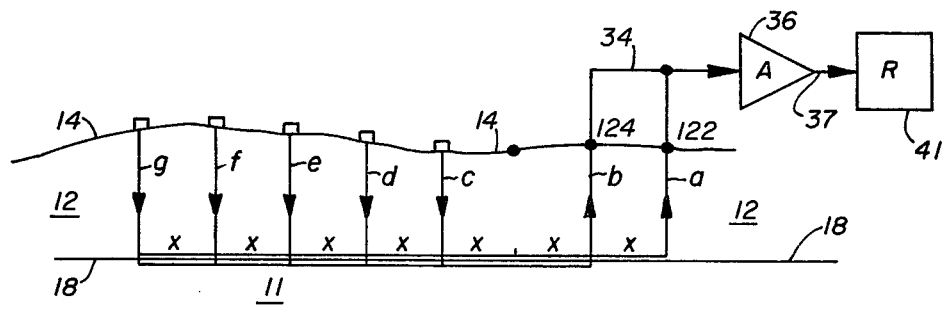
FIG. 6 illustrates a variation of the embodiment of FIG. 1 to determine the differential static weathering correction at two adjacent receiver points.

It will be clear that if a source is positioned at each geophone position, a corresponding diagram to that of FIG. 1 can be made, as shown in FIG. 6, in which points 122, 124 represent fixed geophone positions, while points 132A, 132B, 132C . . . 132N represent successive source positions. In this case an equation similar to equation 5 can be written, where pairs of traces to be chosen to two fixed geophones from successive source positions can be correlated, and the time differences summed and averaged to provide a precise value of the difference in weathering travel time under two adjacent geophone positions.

Referring to FIG. 6 and comparing with FIGS. 1, 2 and 3, corresponding equations can be written:

$$T_A = c + 3x + a$$
$$T_A' \, d + 3x + b$$
$$T_B = d + 4x + a$$
$$T_B' \, e + 4x + b$$
$$T_C = e + 5x + a$$
$$T_C' = f + 5x + b, \text{ etc.}$$

or, the differential correction (122-124) can be written as $$K = 1/N \sum_A^N (T_A - T_A')$$
$$= 1/N [N(a - b) + c - n]$$
$$= (a - b)$$

which is identical to that of equation 5 and FIG. 1.

The precision of this method should be equal to that described by equation 5 and since it involves entirely different trace combinations, provides an independent computation.

The method illustrated by these equations can be used even though the sources are not positioned at each geophone position. In that case, since the geophones will be spaced closer together than the source points, more separate determinations will be made.

Figure 7:
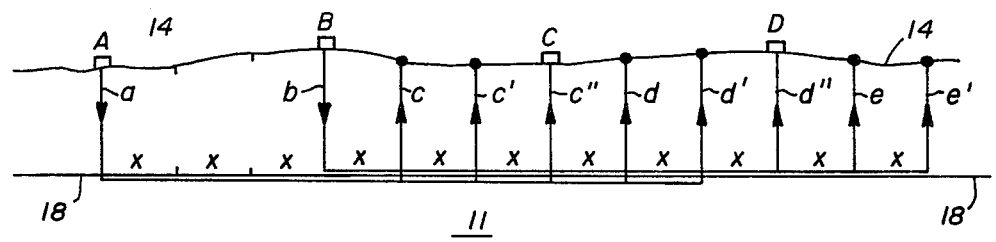
FIG. 7 illustrates the case of FIG. 1 where the spacing between source points is N times the spacing between receiver points.

FIG. 7 illustrates the case shown in FIG. 1 where the source spacing is three times the geophone spacing. Source points are indicated as A, B, C, D, etc. Geophone positions are indicated by numerals 100, 101, 102, 103, etc. Again we can write:

$$T_A = a + 4x + c$$
$$T_A' = b + 4x + d$$
$$T_B = a + 5x + c'$$
$$T_B' = b + 5x + d'$$
$$T_C = a + 6x + c''$$
$$T_C' = b + 6x + d''$$
$$T_D = a + 7x + d$$
$$T_D' = b + 7x + e, \text{ etc.}$$

and $$T_A - T_A' = a - b + c - d$$
$$T_B - T_B' = 1 - b + c' - d'$$
$$T_C - T_C' = a - b + c'' - d''$$
$$T_D - T_D' = a - b + d - e, \text{ etc.}$$

$$K = 1/N \sum_A^N (T_A - T_A')$$
$$= 1/N [N(a - b) + c + c' + c'' - n - n' - n'']$$
$$= (a - b)$$

Here, although these are not as many source points as receiver points, there are almost as many values of N that can be used in determining the average value of differential correction, K.

While the invention has been described principally in terms of a system using a vibratory seismic source, the choice of this type of system for illustrating the invention is solely for convenience. Because of the limitations of such vibratory surface systems, they are the systems which most importantly require a precise method of determining the differential static corrections between adjacent records, recorded from adjacent source points.

It will be clear that this method is equally applicable to seismic operations using sources of any type, and including, but not limited to systems which use surface sources, such as vibratory sources, surface impulsive sources such as Dynoseis, or thumper, or explosive sources, shallow inhole impulsive sources, and deep inhole impulsive sources, and so on.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a seismic system having a linear array of source positions A, B, and receiver positions C, D, E, F down line from said source positions, the spacings AB, BC, CD, DE, EF, etc. being equal, the method of determining the differential static corrections by transmission two ways through the weathered layer between the records from adjacent closely-spaced source points A and B, comprising the steps of;
   (a) recording a first record from a first source point A to receiver positions C, D, and E;
   (b) recording a second record from a second source point B adjacent said first source point A to receiver positions D, E and F;
   (c) correlating selected initial short portions of a first trace AC of said first record with the equal initial short portion of the corresponding first trace BD of said second record whereby only refracted seismic waves at the base of weathering are correlated, and reflected waves from deep interfaces are excluded from the correlations;
   (d) determining the first timing difference $K_1$, in travel times through the weathered layer at source points A and B for said first pair of traces AC and BD;

(e) repeating steps (c) and (d) for at least a second pair of corresponding traces, such as AD and BE and determining a second timing difference $K_2$ in travel times through the weathered layer at source points A and B for said second pair of traces AD and BE; and (f) determining the average value $K_A$ of all of said plurality of timing differences $K_1$ and $K_2$.

2. The method as in claim 1 including the additional steps of repeating steps (c) and (d) for all of the pairs of traces; and determining the average $K_A$ of all of said plurality of timing differences in travel times through the weathered layer.

3. The method as in claim 2 in which said number of traces is at least 100.

4. The method as in claim 1 in which said step (c) of correlating selected equal portions of a pair of corresponding traces on each of said two records, comprises the steps of:

(a) multiplying said two corresponding traces;

(b) varying the time phase of one of said pair of traces with respect to the other, and repeating said multiplying step;

(c) integrating said products at each value of time phase;

(d) displaying said integrals as a function of said time phase.

5. The method as in claim 1 in which said selected portion of said traces includes the portion from the first breaks to a selected time interval after said first breaks.

6. The method as in claim 5 in which said selected time interval is less than 100 milliseconds.

7. The method as in claim 5 in which said time interval is less than 250 milliseconds.

8. The method as in claim 1 in which said step of correlation comprises the steps of measuring the travel time for each trace from the time break to the first break and, subtracting one travel time from the other.

9. The method as in claim 8 in which the time difference is measured optically from a printed record.

10. The method as in claim 1 in which the source is impulsive.

11. The method as in claim 1 in which said source is vibratory, and including the step of correlating the record against the sweep before correlating said pair of traces.

12. The method as in claim 1 in which said sources are surface sources.

13. The method as in claim 1 in which there are as many source points as geophone positions.

14. The method as in claim 13 in which the spacing between source positions is the same as between geophone positions, and on successive source initiations, the source points coincide with the geophone positions, C,D,E,F, etc.

15. The method as in claim 1 in which the distance from said first source to the geophone recording said first trace of said first record is equal to the distance from said second source to the geophone recording said first trace of said second record.

16. The method as in claim 1 in which the distance between said first and second source points is equal to the distance between the geophones recording said first trace of said first record and said first trace of said second record.

17. The method as in claim 1 in which the direction from said first source to the geophone recording said first trace of said first record is the same as the direction from said second source to the geophone recording said first trace of said second record.

18. In seismic operations the method of determining the static corrections between traces from a plurality of source points to adjacent geophone points in a line of geophones, comprising the steps of:

(a) recording a first record from a first source point A downline to at least a selected pair of spaced geophones X and Y;

(b) recording a second record from a second source point B downline to at least said pair of spaced geophones X and Y;

(c) correlating a selected initial short portion of length L of the first trace of said first record from said first source point A to said first geophone X, with a selected equal initial short portion of length L of the corresponding trace of said second record from said second source point B to said second geophone Y; whereby only refracted seismic waves at the base of weathering are correlated, and reflected waves from deep interfaces are excluded from the correlation;

(d) determining the first timing difference in travel times through the weathered layer for said first pair of traces;

(e) recording a third record at a third source point C to said at least pair of spaced geophones X and Y;

(f) correlating a selected initial short portion of length L of the first trace of said second record from said second source B to said first geophone X with a selected equal initial short portion of length L of the corresponding trace of said third record from said third source point C to said second geophone Y;

(g) determining the second timing difference in travel time through the weathered layer for said second pair of traces;

(h) determining the average of said first and second timing differences, and wherein the spacing between source positions AB, BC, CD, equal the spacing XY between geophones X and Y.

19. The method as in claim 18 including the steps of repeating steps (a), (f), and (g) for additional spaced source points D, E, . . . .N to said geophones X and Y, and determining the average of all of said plurality of timing differences in travel times through the weathered layer at said geophones X and Y.

20. The method as in claim 1 including the step of applying said timing difference $K_A$ to one of said first and second records with respect to the other.

* * * * *